United States Patent
Holmes

(10) Patent No.: US 12,134,494 B2
(45) Date of Patent: Nov. 5, 2024

(54) VERIFICATION SYSTEM FOR A PHARMACY PACKAGING SYSTEM

(71) Applicant: RXSAFE LLC, Vista, CA (US)

(72) Inventor: William K. Holmes, San Diego, CA (US)

(73) Assignee: RXSAFE, LLC, Vista, CA (US)

( * ) Notice: Subject to any disclaimer, the term of this patent is extended or adjusted under 35 U.S.C. 154(b) by 126 days.

(21) Appl. No.: 18/147,281

(22) Filed: Dec. 28, 2022

(65) Prior Publication Data

US 2023/0211912 A1 Jul. 6, 2023

Related U.S. Application Data

(60) Provisional application No. 63/296,120, filed on Jan. 3, 2022.

(51) Int. Cl.
*B65B 57/10* (2006.01)
*B65B 9/02* (2006.01)
(Continued)

(52) U.S. Cl.
CPC ............... *B65B 57/10* (2013.01); *B65B 9/02* (2013.01); *B65B 41/16* (2013.01); *B65B 61/26* (2013.01);
(Continued)

(58) Field of Classification Search
CPC .. B65B 57/10; B65B 9/00; B65B 9/02; H04N 23/00; H04N 23/56; H04N 23/11
See application file for complete search history.

(56) References Cited

U.S. PATENT DOCUMENTS

| 3,709,598 A | 1/1973 | Vandenberg et al. |
| 4,546,901 A | 10/1985 | Buttarazzi |

(Continued)

FOREIGN PATENT DOCUMENTS

| EP | 2591761 A1 | 5/2013 |
| JP | 2006069618 A | 3/2006 |

(Continued)

OTHER PUBLICATIONS

J. J. Caban, et al., "Automatic identification of prescription drugs using shape distribution models", 2012 19th IEEE International Conference on Image Processing, pp. 1005-1008.

(Continued)

*Primary Examiner* — Gloria R Weeks
(74) *Attorney, Agent, or Firm* — Michael Best & Friedrich LLP

(57) ABSTRACT

An automatic packager configured to dispense pharmaceuticals into a pharmaceutical pouch and including a verification system. The verification system includes a camera system configured to capture images in a visible spectrum and an infrared spectrum, a heat source configured to heat the pharmaceutical pouch, a visible light source, and an electronic processor communicatively coupled to the camera system, the heat source, and the visible light source. The electronic processor is configured to activate the heat source to heat the pharmaceutical pouch and capture a first image of the pharmaceutical pouch when the pharmaceutical pouch is heated by the heat source. The electronic processor is also configured to activate the visible light source and capture a second image of the pharmaceutical pouch while illuminated by the visible light source. The electronic processor is further configured to generate a third image based on the first image and the second image.

20 Claims, 11 Drawing Sheets

(51) Int. Cl.
  *B65B 41/16* (2006.01)
  *B65B 61/26* (2006.01)
  *B65C 9/46* (2006.01)
  *H04N 23/11* (2023.01)
  *H04N 23/56* (2023.01)
(52) U.S. Cl.
  CPC .............. *B65C 9/46* (2013.01); *H04N 23/11* (2023.01); *H04N 23/56* (2023.01)

(56) References Cited

U.S. PATENT DOCUMENTS

| | | | |
|---|---|---|---|
| 4,679,068 A | 7/1987 | Lillquist et al. | |
| 4,751,571 A | 6/1988 | Lillquist | |
| 5,522,512 A | 6/1996 | Archer et al. | |
| 5,568,715 A * | 10/1996 | Ebel | B65B 25/008 |
| | | | 53/494 |
| 6,079,284 A | 6/2000 | Yamamoto et al. | |
| 6,108,030 A * | 8/2000 | Yamamoto | G01N 21/9508 |
| | | | 209/939 |
| 6,286,421 B1 | 9/2001 | Ackley | |
| 6,324,253 B1 * | 11/2001 | Yuyama | G01N 23/04 |
| | | | 378/57 |
| 6,330,351 B1 | 12/2001 | Yasunaga | |
| 6,345,487 B1 | 2/2002 | Luciano et al. | |
| 6,434,911 B1 | 8/2002 | Yamamoto et al. | |
| 6,450,089 B2 | 9/2002 | Ackley | |
| 6,481,347 B2 | 11/2002 | Ackley | |
| 6,505,461 B1 | 1/2003 | Yasunaga | |
| 6,535,637 B1 | 3/2003 | Wootton et al. | |
| 6,739,455 B2 | 5/2004 | Yamamoto et al. | |
| 6,741,731 B1 | 5/2004 | Yamamoto et al. | |
| 6,805,245 B2 * | 10/2004 | Kenneway | B07C 5/342 |
| | | | 209/555 |
| 7,079,236 B2 | 7/2006 | Yamamoto et al. | |
| 7,102,741 B2 | 9/2006 | Ackley, Jr. et al. | |
| 7,218,395 B2 | 5/2007 | Kaye et al. | |
| 7,701,568 B2 | 4/2010 | Ackley, Jr. et al. | |
| 7,706,596 B2 * | 4/2010 | Garvey | G01N 25/72 |
| | | | 382/141 |
| 7,769,221 B1 | 8/2010 | Shakes et al. | |
| 7,782,365 B2 | 8/2010 | Levien et al. | |
| 7,794,394 B2 | 9/2010 | Frangioni | |
| 7,994,480 B2 | 8/2011 | Johnson et al. | |
| 7,995,831 B2 | 8/2011 | Eller et al. | |
| 8,037,992 B2 | 10/2011 | Ackley, Jr. et al. | |
| 8,060,249 B2 | 11/2011 | Bear et al. | |
| 8,072,590 B2 | 12/2011 | Ackley, Jr. et al. | |
| 8,146,331 B2 | 4/2012 | Soloman | |
| 8,269,958 B2 | 9/2012 | Ackley, Jr. et al. | |
| 8,271,128 B1 | 9/2012 | Schultz | |
| 8,295,582 B2 | 10/2012 | Eller et al. | |
| 8,300,922 B1 | 10/2012 | Garvey, III | |
| 8,340,392 B2 | 12/2012 | Kim | |
| 8,457,361 B2 | 6/2013 | Julius et al. | |
| 8,467,897 B2 | 6/2013 | Holmes et al. | |
| 8,538,581 B2 | 9/2013 | Kuehnrich et al. | |
| 8,571,297 B2 | 10/2013 | Eller et al. | |
| 8,582,863 B2 | 11/2013 | Van Den Brink | |
| 8,583,281 B2 | 11/2013 | Bear et al. | |
| 8,584,715 B2 | 11/2013 | Stoeckel et al. | |
| 8,646,591 B2 | 2/2014 | De Ruijter et al. | |
| 8,712,163 B1 | 4/2014 | Osheroff | |
| 8,727,208 B2 | 5/2014 | Poisner | |
| 8,729,528 B2 | 5/2014 | Klem et al. | |
| 8,742,398 B2 | 6/2014 | Klem et al. | |
| 8,749,635 B2 | 6/2014 | Högasten et al. | |
| 8,755,597 B1 * | 6/2014 | Tantalo | G06T 5/50 |
| | | | 382/284 |
| 8,791,993 B2 | 7/2014 | Kim | |
| 8,943,779 B2 | 2/2015 | Amano et al. | |
| 8,959,878 B2 * | 2/2015 | Okuma | A61J 3/00 |
| | | | 53/550 |
| 8,964,054 B2 | 2/2015 | Jung et al. | |
| 8,966,863 B2 | 3/2015 | Amano et al. | |
| 9,008,408 B2 | 4/2015 | Sinbar et al. | |
| 9,041,826 B2 | 5/2015 | Jung et al. | |
| 9,098,900 B2 | 8/2015 | Helgason et al. | |
| 9,135,701 B2 | 9/2015 | Guissin et al. | |
| 9,184,204 B2 | 11/2015 | Hu | |
| 9,202,194 B1 | 12/2015 | Mistry | |
| 9,233,767 B2 | 1/2016 | Amano et al. | |
| 9,235,690 B2 | 1/2016 | Bear et al. | |
| 9,259,766 B2 | 2/2016 | Ackley et al. | |
| 9,272,795 B2 | 3/2016 | Chudy | |
| 9,311,451 B2 | 4/2016 | Bae et al. | |
| 9,334,096 B2 | 5/2016 | Luciano et al. | |
| 9,387,155 B2 * | 7/2016 | Morioka | G05B 15/02 |
| 9,406,127 B2 | 8/2016 | Helgason et al. | |
| 9,407,838 B2 | 8/2016 | Butte et al. | |
| 9,413,988 B2 | 8/2016 | Heinke et al. | |
| 9,468,948 B2 | 10/2016 | Ackley et al. | |
| 9,517,855 B2 | 12/2016 | Murokh | |
| 9,599,461 B2 | 3/2017 | Gerlach et al. | |
| 9,621,749 B2 | 4/2017 | Jung et al. | |
| 9,637,323 B2 | 5/2017 | Kim | |
| 9,716,843 B2 | 7/2017 | Fox et al. | |
| 9,730,649 B1 | 8/2017 | Jepsen | |
| 9,731,909 B2 | 8/2017 | Kim | |
| 9,741,761 B2 | 8/2017 | Jiang et al. | |
| 9,757,772 B2 | 9/2017 | Ackley et al. | |
| 9,766,114 B2 | 9/2017 | Ademe | |
| 9,776,755 B2 * | 10/2017 | Kondo | G07F 17/0092 |
| 9,835,445 B2 | 12/2017 | Strandemar et al. | |
| 9,836,583 B2 | 12/2017 | Garcia et al. | |
| 9,843,743 B2 | 12/2017 | Lewis et al. | |
| 9,886,751 B2 | 2/2018 | Jacobs et al. | |
| 9,906,739 B2 | 2/2018 | Sugano et al. | |
| 9,912,913 B2 | 3/2018 | Johnson et al. | |
| 9,994,347 B2 | 6/2018 | Yuyama et al. | |
| 10,015,474 B2 | 7/2018 | Rhead et al. | |
| 10,187,593 B2 | 1/2019 | Holmes | |
| 10,594,956 B2 * | 3/2020 | Holmes | G06V 20/00 |
| 10,713,540 B2 | 7/2020 | Zhang et al. | |
| 10,839,501 B2 * | 11/2020 | Futase | B29C 66/93451 |
| 10,881,581 B2 * | 1/2021 | Koike | G07G 1/0045 |
| 10,926,907 B2 * | 2/2021 | Maruyama | A61J 1/035 |
| 11,039,091 B2 | 6/2021 | Holmes et al. | |
| 11,195,270 B2 | 12/2021 | Hellenbrand | |
| 11,289,179 B1 | 3/2022 | Brown et al. | |
| 11,595,595 B2 | 2/2023 | Holmes et al. | |
| 11,753,193 B2 * | 9/2023 | Holmes | B65B 9/02 |
| | | | 53/473 |
| 2002/0066867 A1 * | 6/2002 | Ross, III | G01N 21/9508 |
| | | | 250/341.1 |
| 2004/0119722 A1 | 6/2004 | Hilbert et al. | |
| 2006/0015536 A1 | 1/2006 | Buchanan et al. | |
| 2006/0271237 A1 | 11/2006 | Kim | |
| 2007/0008326 A1 | 1/2007 | Levien et al. | |
| 2007/0189597 A1 | 8/2007 | Limer et al. | |
| 2008/0056556 A1 | 3/2008 | Eller et al. | |
| 2008/0307757 A1 | 12/2008 | Heim et al. | |
| 2009/0055116 A1 | 2/2009 | Chen et al. | |
| 2010/0071320 A1 | 3/2010 | Ali et al. | |
| 2011/0137177 A1 | 6/2011 | Toma et al. | |
| 2011/0184751 A1 | 7/2011 | Holmes | |
| 2011/0188707 A1 | 8/2011 | Shutt | |
| 2012/0002042 A1 * | 1/2012 | Okuma | A61J 7/02 |
| | | | 348/135 |
| 2012/0200596 A1 | 8/2012 | Gotou et al. | |
| 2012/0304596 A1 * | 12/2012 | Koike | B65B 5/103 |
| | | | 53/136.1 |
| 2013/0058550 A1 | 3/2013 | Tanimoto et al. | |
| 2013/0142406 A1 | 6/2013 | Lang et al. | |
| 2013/0170732 A1 | 7/2013 | Gotou et al. | |
| 2013/0176424 A1 | 7/2013 | Weil | |
| 2013/0188038 A1 | 7/2013 | Tanimoto et al. | |
| 2013/0218330 A1 | 8/2013 | Chudy et al. | |
| 2013/0279774 A1 | 10/2013 | Helgason et al. | |
| 2013/0307992 A1 | 11/2013 | Erlandsson et al. | |
| 2013/0318931 A1 | 12/2013 | Holmes | |
| 2013/0342676 A1 | 12/2013 | Amano et al. | |
| 2014/0033644 A1 | 2/2014 | Amano et al. | |
| 2014/0094960 A1 | 4/2014 | Holmes | |

(56) References Cited

U.S. PATENT DOCUMENTS

| | | |
|---|---|---|
| 2014/0231881 A1 | 8/2014 | Parks |
| 2014/0236349 A1 | 8/2014 | Bae et al. |
| 2014/0261881 A1 | 9/2014 | Chudy |
| 2015/0077534 A1 | 3/2015 | Derenne et al. |
| 2015/0170373 A1 | 6/2015 | Yonaha et al. |
| 2015/0192525 A1 | 7/2015 | Sinbar et al. |
| 2015/0266604 A1 | 9/2015 | Amano et al. |
| 2015/0269742 A1 | 9/2015 | Bergstrom et al. |
| 2015/0347832 A1 | 12/2015 | Shutt |
| 2015/0379712 A1 | 12/2015 | Guissin et al. |
| 2016/0065909 A1 | 3/2016 | Derenne et al. |
| 2016/0199260 A1 | 7/2016 | Andersen, Sr. |
| 2016/0323522 A1 | 11/2016 | Heinke et al. |
| 2016/0364858 A1 | 12/2016 | Butte et al. |
| 2017/0015445 A1 | 1/2017 | Holmes |
| 2017/0020785 A1 | 1/2017 | McCullough |
| 2017/0061663 A1 | 3/2017 | Johnson et al. |
| 2017/0081069 A1 | 3/2017 | Murokh |
| 2017/0163972 A1 | 6/2017 | Köhler et al. |
| 2017/0227942 A1 | 8/2017 | Thomson et al. |
| 2017/0254762 A1 | 9/2017 | Yoo |
| 2017/0301087 A1 | 10/2017 | Yuyama et al. |
| 2017/0305589 A1* | 10/2017 | Yuyama .................. B65B 35/14 |
| 2017/0312182 A1 | 11/2017 | Ma |
| 2017/0354574 A1 | 12/2017 | Feng et al. |
| 2017/0355476 A1 | 12/2017 | Kim |
| 2017/0357775 A1 | 12/2017 | Ekin |
| 2017/0358621 A1 | 12/2017 | Jiang et al. |
| 2018/0039564 A1 | 2/2018 | Zimmerman et al. |
| 2018/0068087 A1 | 3/2018 | Garcia et al. |
| 2018/0091745 A1 | 3/2018 | Holmes |
| 2018/0170591 A1* | 6/2018 | Koike .................... B65B 41/12 |
| 2018/0177682 A1 | 6/2018 | Tanaka |
| 2018/0225818 A1 | 8/2018 | Jacobs et al. |
| 2019/0050660 A1 | 2/2019 | Iwami |
| 2019/0110007 A1 | 4/2019 | Holmes |
| 2019/0112080 A1 | 4/2019 | Holmes |
| 2019/0178815 A1 | 6/2019 | Tojo |
| 2019/0201284 A1 | 7/2019 | Koike et al. |
| 2019/0259143 A1* | 8/2019 | Futase ................ G01N 21/8851 |
| 2020/0143545 A1 | 5/2020 | Weng et al. |
| 2020/0221039 A1 | 7/2020 | Holmes |
| 2020/0342972 A1 | 10/2020 | Chudy et al. |
| 2020/0404196 A1 | 12/2020 | Holmes et al. |
| 2021/0015711 A1 | 1/2021 | Iwami |
| 2021/0274109 A1 | 9/2021 | Holmes et al. |
| 2022/0287915 A1 | 9/2022 | Lebrun |
| 2023/0101967 A1* | 3/2023 | Holmes ..................... A61J 7/02 53/415 |
| 2023/0136271 A1 | 5/2023 | Chudy |

FOREIGN PATENT DOCUMENTS

| | | | |
|---|---|---|---|
| WO | 1999017218 A1 | 4/1999 | |
| WO | 2002025568 A2 | 3/2002 | |
| WO | 2013129099 A1 | 9/2013 | |
| WO | 2013181416 A1 | 12/2013 | |
| WO | 2014119994 A1 | 8/2014 | |
| WO | WO 2014119994 * | 8/2014 | ............. G01N 21/95 |
| WO | 2016047295 A1 | 3/2016 | |
| WO | 2016047569 A1 | 3/2016 | |

OTHER PUBLICATIONS

R. Palenychka, et al., "Verification of Medication Dispensing Using the Attentive Computer Vision Approach", 2018 IEEE International Symposium on Circuits and Systems (ISCAS), pp. 1-4.

\* cited by examiner

FIG. 8

VERIFICATION SYSTEM FOR A PHARMACY PACKAGING SYSTEM

CROSS-REFERENCE TO RELATED APPLICATIONS

This application claims priority to U.S. Provisional Patent Application No. 63/296,120, filed Jan. 3, 2022, the entire contents of which are incorporated by reference herein.

FIELD

The present disclosure relates to pharmacy packaging systems and, more particularly, to verification systems for pharmacy packaging systems.

SUMMARY

One example provides an automatic packager for pharmaceuticals including a feed roll for forming a pharmaceutical pouch, a dispenser configured to dispense pharmaceuticals into the pharmaceutical pouch formed by the feed roll, and a verification system. The verification system includes a camera system configured to capture images in a visible spectrum and an infrared spectrum, a heat source configured to heat the pharmaceutical pouch, a visible light source configured to output visible spectrum light, and an electronic processor communicatively coupled to the camera system, the heat source, and the visible light source. The electronic processor is configured to activate the heat source to heat the pharmaceutical pouch and capture a first image, using the camera system, of the pharmaceutical pouch when the pharmaceutical pouch is heated by the heat source. The electronic processor is also configured to activate the visible light source to illuminate the pharmaceutical pouch and capture a second image, using the camera system, of the pharmaceutical pouch while illuminated by the visible light source. The electronic processor is further configured to generate a third image based on the first image and the second image and generate a dashboard to simultaneously display first images, second images, and third images, from a plurality of pharmaceutical pouches. The first image, the second image, and the third image are arrayed in a grid on the dashboard.

Another example provides a method for verifying pharmaceuticals packaged by an automatic packager. The automatic packager includes a feed roll for forming a pharmaceutical pouch, a dispenser configured to dispense pharmaceuticals into the pharmaceutical pouch formed by the feed roll, a camera system configured to capture images in a visible spectrum and an infrared spectrum, a heat source configured to heat the pharmaceutical pouch, a visible light source configured to output visible spectrum light, and an electronic processor communicatively coupled to the camera system, the heat source, and the visible light source. The method includes activating, by the electronic processor, the heat source to heat the pharmaceutical pouch and capturing a first image, by the electronic processor using the camera system, of the pharmaceutical pouch when the pharmaceutical pouch is heated by the heat source. The method also includes activating, by the electronic processor, the visible light source to illuminate the pharmaceutical pouch and capturing a second image, by the electronic processor using the camera system, of the pharmaceutical pouch while illuminated by the visible light source. The method further includes generating, by the electronic processor, a third image based on the first image and the second image and generating, by the electronic processor, a dashboard to simultaneously display first images, second images, and third images, from a plurality of pharmaceutical pouches. The first image, the second image, and the third image are arrayed in a grid on the dashboard.

Other examples, aspects, embodiments, and features will become apparent by consideration of the detailed description and accompanying drawings.

BRIEF DESCRIPTION OF THE DRAWINGS

FIG. 8 illustrates a dashboard generated for verifying pharmaceuticals in pouches packaged by the automatic packager of FIG. 1 in accordance with some examples.

DETAILED DESCRIPTION

Before any examples, features, aspects, or embodiments are explained in detail, it is to be understood that the examples, features, aspects, or embodiments are not limited in their application to the details of construction and the arrangement of components set forth in the following description or illustrated in the following drawings. The examples, features, aspects, or embodiments are capable of other embodiments and of being practiced or of being carried out in various ways. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Figure 1:
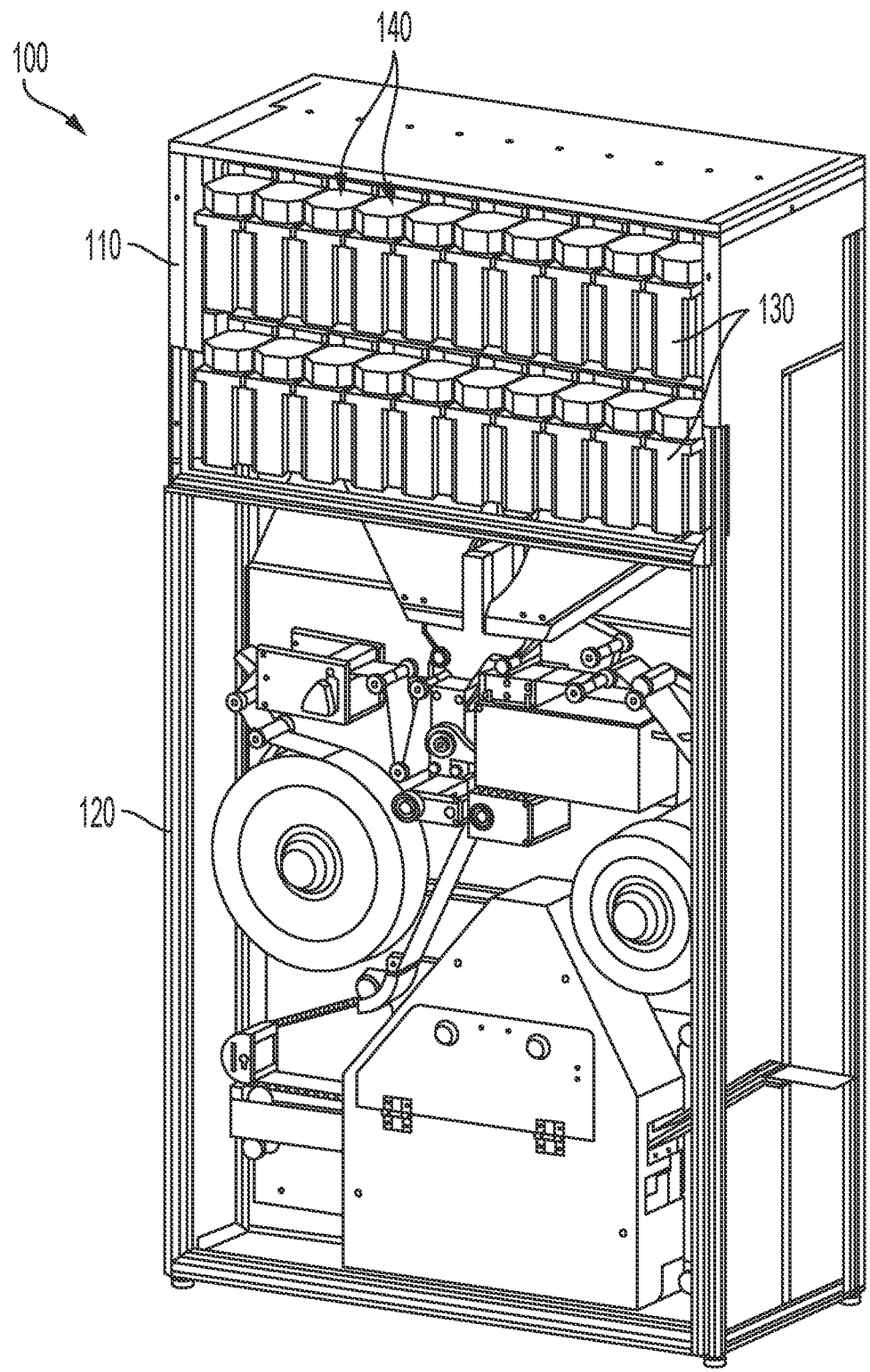
FIG. 1 is a perspective view of an automatic packager for medications in accordance with some examples.

FIG. 1 illustrates an automatic packager 100 including a universal feed cassette 110 and a packaging unit 120 according to an example. The universal feed cassette 110 receives medications from bulk canisters and individually dispenses pills to the packaging unit 120. Each universal feed cassette 110 may dispense ten separate pills at the same time. In other examples, the universal feed cassette 110 may dispense twenty or more separate pills at the same time. In some examples, the automatic packager 100 may include more than one universal feed cassette 110.

The universal feed cassette 110 includes a plurality of cartridges 130 arranged within the housing of the universal feed cassette 110. In one example, the universal feed cassette 110 may include up to ten cartridges 130 that are received in cartridge slots 140. In another example, the universal feed cassette 110 may include up to twenty, up to thirty, up to forty, or more cartridges 130 that are received in the cartridge slots 140. For example, the cartridges 130 may be received in two levels or tiers of cartridge slots 140. A pharmacist may load medications from bulk canisters into each of the cartridges 130. The same medications may be loaded into each cartridge 130, or different medications may be loaded into each cartridge 130. The cartridges 130 independently dispense the medications to the packaging unit 120.

The cartridges 130 are removably fixed to the universal feed cassette 110. A pharmacist or technician may remove each individual cartridge 130 from the cartridge slot 140 to fill the cartridge 130 with medications from a bulk container. The cartridge 130 can then be placed into any of the cartridge slot 140.

An example cartridge 130 is described in U.S. patent application Ser. No. 16/160,535, filed on Oct. 15, 2018, entitled "UNIVERSAL FEED MECHANISM FOR AUTOMATIC PACKAGER," the entire contents of which are hereby incorporated by reference. In other examples, other suitable cartridges may also or alternatively be used. In the example illustrated in FIG. 1, the packaging unit 120 is a strip packager. An example strip packager is described in U.S. Patent Application Publication No. 2013/031891 and U.S. Patent Application Publication No. 2017/0015445, the entire contents of both of which are hereby incorporated by reference. In other examples, other suitable packaging units, including strip packagers, blister card packagers, and the like, may also or alternatively be used.

Figure 2:
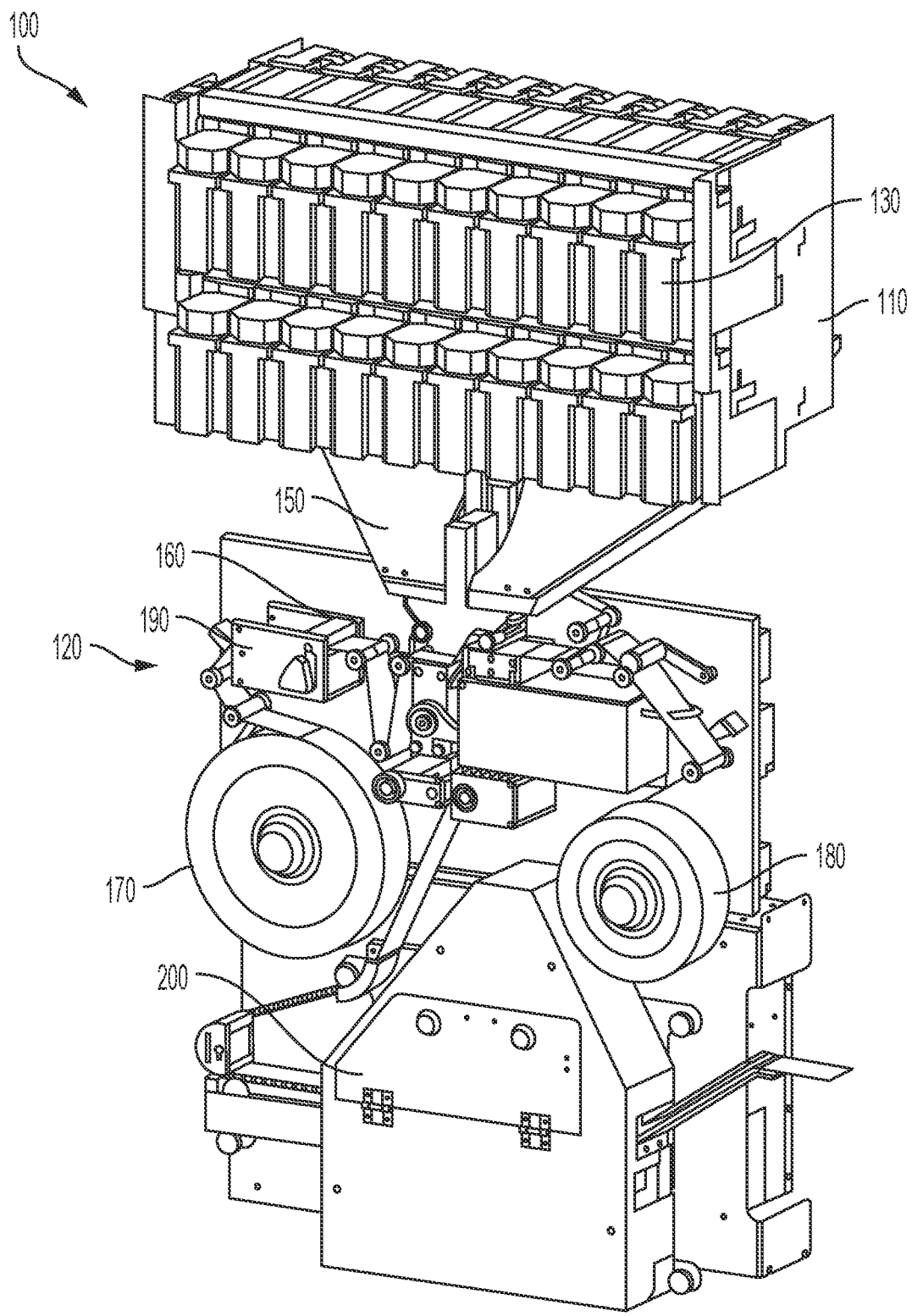
FIG. 2 is a perspective view of a packaging unit of the automatic packager of FIG. 1 in accordance with some examples.

FIG. 2 illustrates one example of the packaging unit 120. In the example illustrated, the packaging unit 120 includes a manifold 150, a receptacle 160, two feed stock rolls 170, 180, a take-up roll, and a verification system 200. The universal feed cassette 110 is placed on top of the manifold 150. The manifold 150, or chute, includes a plurality of discrete tracks corresponding to each of the cartridges 130 (particularly, a conduit of each cartridge 130) mounted on the manifold 150. The tracks are independent channels that together form the manifold 150. The tracks direct pharmaceuticals from the universal feed cassette 110 toward packaging equipment of the packaging unit 120. Conduits of the cartridges 130 align with holes in the manifold 150 such that medications slide down the manifold 150 toward the packaging equipment. The tracks isolate the medications from each other as the medications slide down the manifold 150 to the receptacle 160.

The receptacle 160 collects the medications from the manifold 150. After the medications pass through to the receptacle 160, the medications are sandwiched between two strips of material (e.g., foil, plastic, paper, etc.) from the feed stock rolls 170, 180. Therefore, in one example, the manifold 150 and the receptacle 160 form a dispenser configured to dispense pharmaceuticals into the pharmaceutical pouch formed by the feed stock rolls 170, 180. In some examples, the first feed roll 170 and the second feed roll 180 are both made of an opaque metallic foil. In other examples, the first feed roll 170 is made of a first material that is an opaque metallic foil (e.g., aluminum or tin foil) and the second feed roll 180 is made of a second material that is clear (e.g., a transparent plastic material) to allow a pharmacist to look through the pouch to see the medications inside the pouch. In yet other examples, the first feed roll 170 is made of the first material that is an opaque metallic foil (e.g., aluminum or tin foil) and the second feed roll 180 is made of a second material that is a colored translucent material (e.g., an orange or yellow colored ultra-violet light blocking transparent or translucent material) to allow a pharmacist to look through the pouch to see the medications inside the pouch. The two strips of material are then heat sealed together to form a pouch for the medications. Once filled and sealed, the pouches are wrapped around the take-up roll to create a single spool of pouches. The spool may correspond to medications requested by a particular patient or a particular facility. In other examples, the pouches may be cut and separated as they are filled, rather than spooled onto the take-up roll continuously. The pouches are dispensed through, for example, a dispenser or dispensing port.

In some examples, the packaging unit 120 may include a printer 190 to print a patient's name, the date, the amount and type of medications contained within, a barcode, and/or other indicia on the pouches as the pouches are formed. The printer 190 may be, for example, a thermal printer. In other examples, the printer 190 may include an ink ribbon or an ink jet. In addition, the packaging unit 120 includes the verification system 200 to monitor and check the pouches as they are spooled onto the take-up roll or dispensed.

Figure 3:
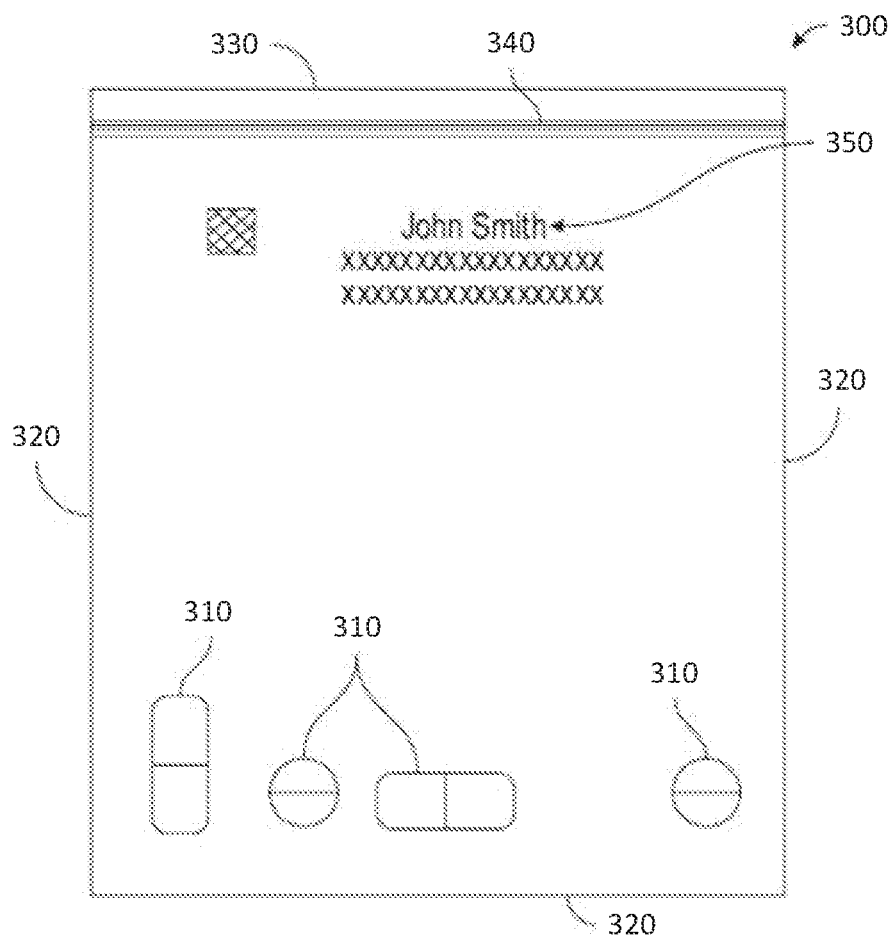
FIG. 3 illustrates a pouch including medication packaged by the automatic packager of FIG. 1 in accordance with some examples.

FIG. 3 illustrates a pouch 300 containing different pharmaceuticals 310 therein. The illustrated pouch 300 is an example of a pouch that may be formed using the packaging equipment of the packaging unit 120 described above. As discussed above, the pouch 300 may be composed of the same material (e.g., opaque metallic foil) on both sides or composed of an opaque metallic foil on one side and a transparent or colored translucent plastic material on the other side. The opaque material includes a metallic foil, for example, aluminum or tin foil. A heat seal 340 extends across the pouch 300 adjacent the open edge 330 to seal the pouch 300. In some examples, all four edges 320, 330 of the pouch 300 may be closed via heat seals. Identification indicia 350 (e.g., a patient's name, a barcode, types of pharmaceuticals, etc.) are printed on the pouch 300 using, for example, a thermal printer, an inkjet printer, a thermal transfer ribbon, or the like. In other examples, the identification indicia 350 may be printed on a label that is coupled to the pouch 300 with adhesives. In further examples, the pouch 300 may include a header area and/or a footer area without medication, but that provides space to print or apply the identification indicia 350.

Figure 4:
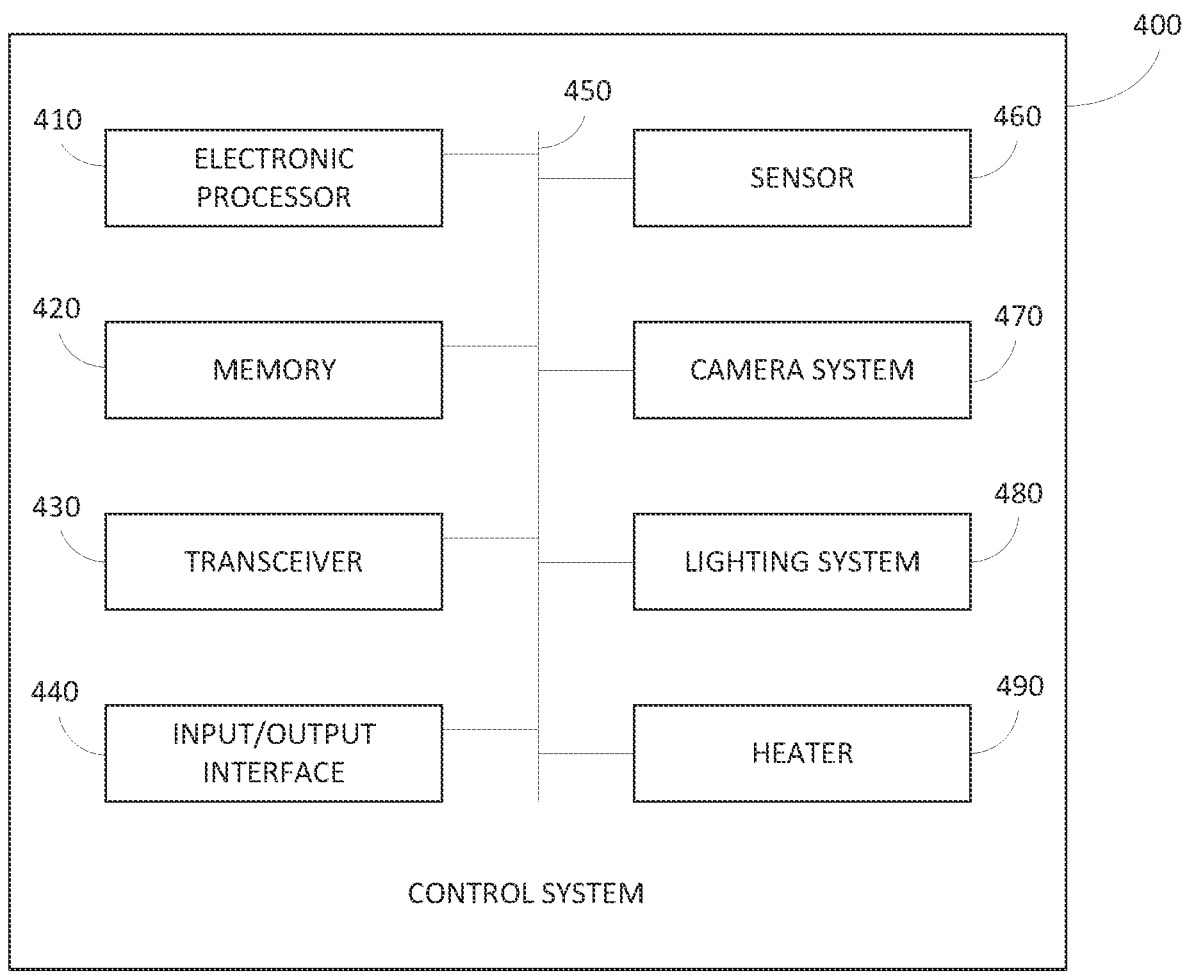
FIG. 4 is a block diagram of a control system included in the automatic packager of FIG. 1 in accordance with some examples.

FIG. 4 illustrates one example of a control system 400 for the automatic packager 100. The control system 400 is electrically coupled to components of the packaging unit 120 and the verification system 200 to control the operation of the automatic packager 100. In particular, the control system 400 controls operation of the feed stock rolls 170, 180 to release and form a pharmaceutical pouch and control the components of the verification system 200 as further described below. In the example illustrated, the control system 400 includes an electronic processor 410, a memory 420, a transceiver 430, and an input/output interface 440. The electronic processor 410, the memory 420, the transceiver 430, and the input/output interface 440 communicate over one or more control and/or data buses (e.g., a communication bus 450). The control system 400 may include more or fewer components and may perform functions other than those explicitly described herein.

In some examples, the electronic processor 410 is implemented as a microprocessor with separate memory, such as the memory 420. In other examples, the electronic processor 410 may be implemented as a microcontroller (with memory 420 on the same chip). In other examples, the electronic processor 410 may be implemented using multiple processors. In addition, the electronic processor 410 may be implemented partially or entirely as, for example, a field-programmable gate array (FPGA), an application specific integrated circuit (ASIC), and the like, and the memory 420 may not be needed or be modified accordingly. In the example illustrated, the memory 420 includes non-transitory, computer-readable memory that stores instructions that are received and executed by the electronic processor 410 to carry out functionality of the control system 400 described herein. The memory 420 may include, for example, a program storage area and a data storage area. The program storage area and the data storage area may include combinations of different types of memory, such as read-only memory and random-access memory.

The transceiver 430 enables wireless communication from the control system 400 to, for example, a remote electronic device such as a server, a smart telephone, a tablet computer or the like of remote pharmacist. In other examples, the transceiver 430 may include separate transmitting and receiving components, for example, a transmitter and a receiver. In yet other examples, the control system 400 may not include a transceiver 430 and may communicate with a remote device via a network interface and a wired connection to a communication network such as the Internet.

As noted above, the control system 400 may include the input/output interface 440 (or more commonly referred to as a user interface). The input/output interface 440 may include one or more input mechanisms (e.g., a touch screen, a keypad, a button, a knob, and the like), one or more output mechanisms (e.g., a display, a printer, a speaker, and the like), or a combination thereof. The input/output interface 440 receives input from the input devices actuated by a user and provides output to the output devices with which a user interacts. In some examples, as an alternative or in addition to managing inputs and outputs through the input/output interface 440, the control system 400 may receive user inputs, provide user outputs, or both by communicating with an external device, such as a console computer, over a wired or wireless connection.

The control system 400 also includes a sensor 460, a camera system 470, a lighting system 480, and a heat source 490, which are controlled by the electronic processor 410 as further described below.

Figure 5A:
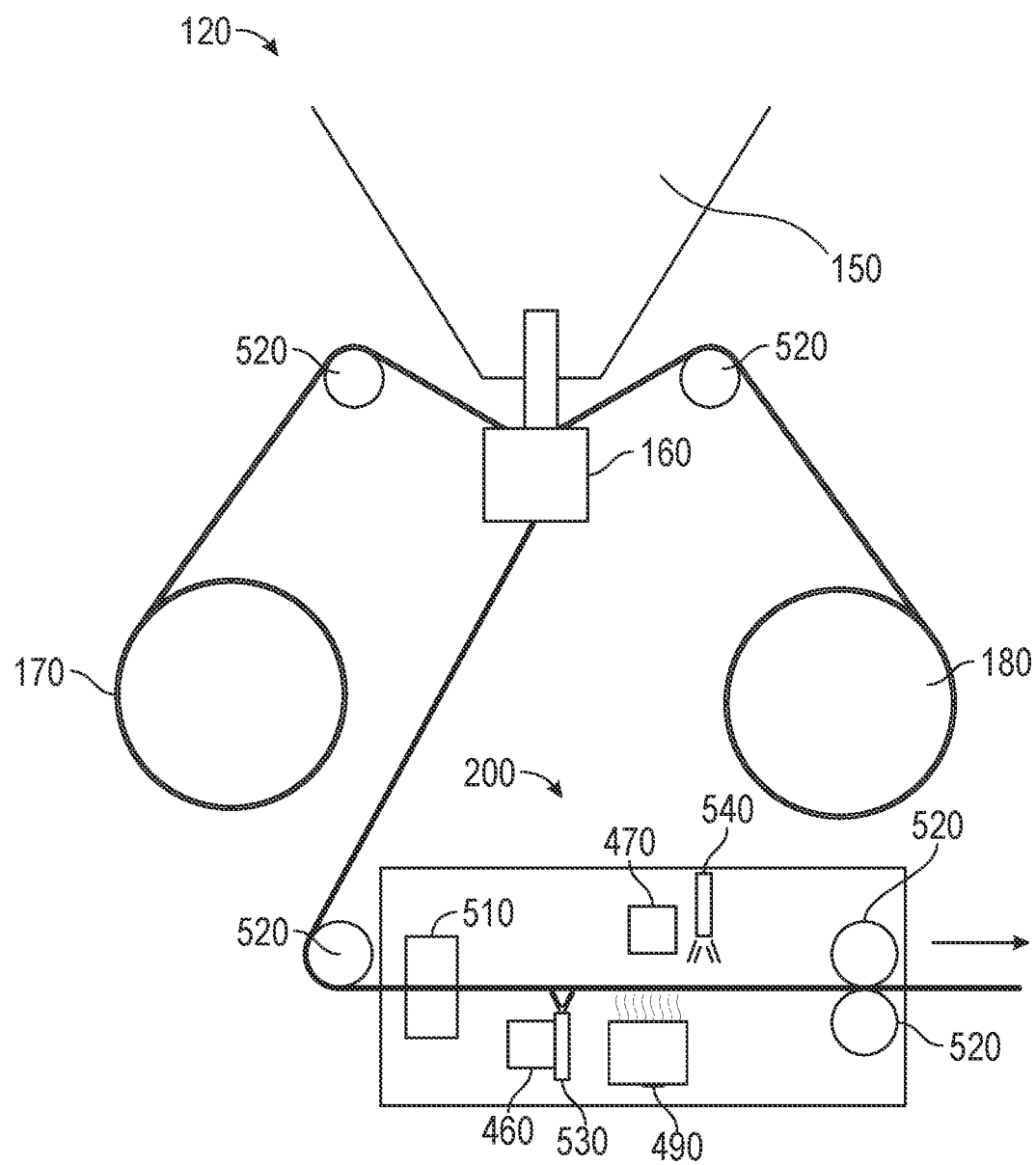
FIG. 5A is a schematic of a verification unit of the packaging unit of FIG. 2 in accordance with some examples.
Figure 5B:
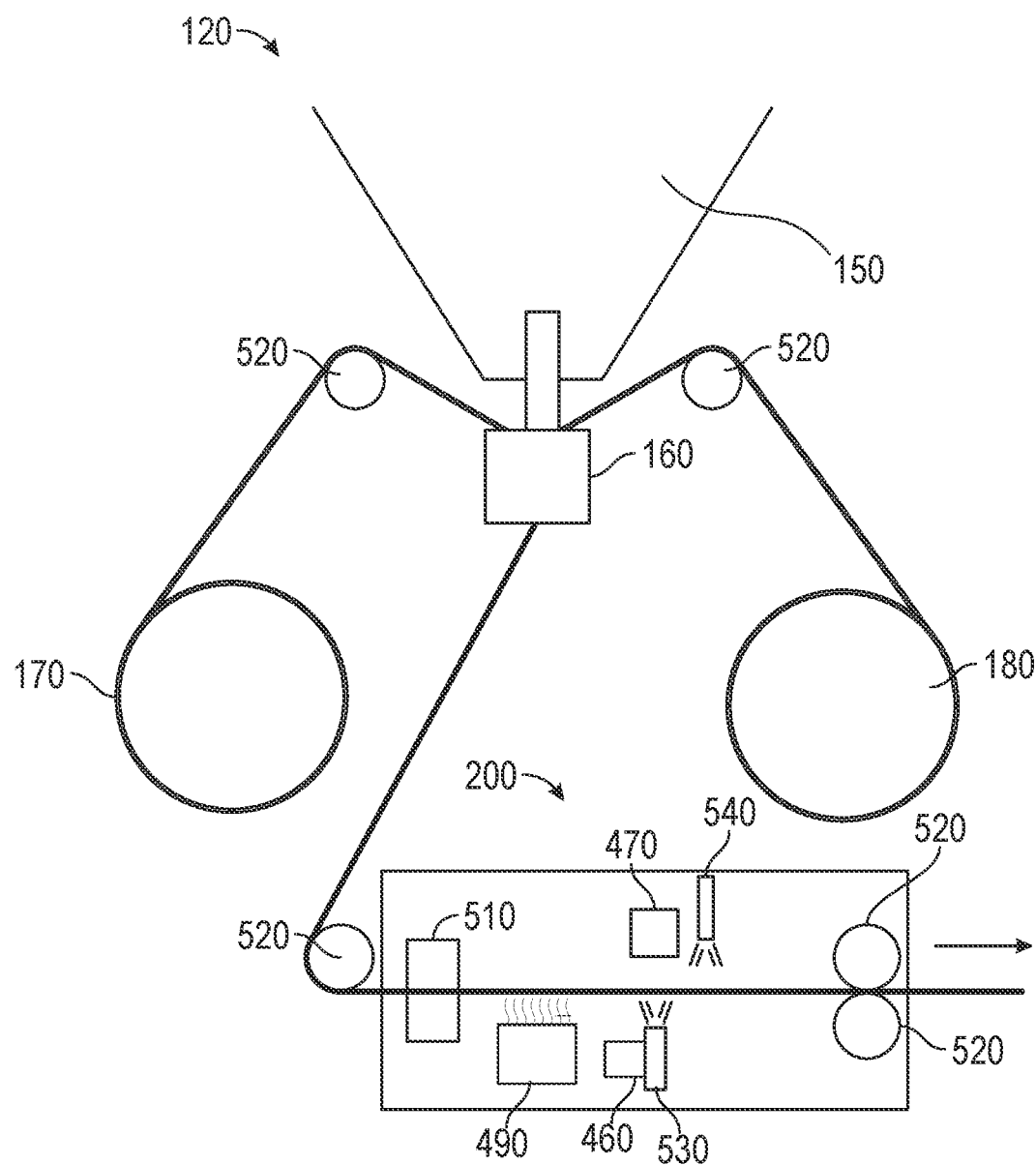
FIG. 5B is a schematic of a verification unit of the packaging unit of FIG. 2 in accordance with some examples.

FIGS. 5A and 5B illustrate a schematic of part of the packaging unit 120 including the verification system 200. The verification system 200 provides a final check of the filled pouches before the pouches are distributed. The verification system 200 is provided downstream of the dispenser (that is, the manifold 150 and the receptacle 160) such that a verification is performed, using a camera system (e.g., camera system 470) subsequent to packaging pharmaceuticals in the pharmaceutical pouch. In the example illustrated, the verification system 200 includes an agitator 510, the sensor 460, the camera system 470 comprised of one or more cameras, and the heat source 490. After the pouches are filled and sealed, the strip of pouches is directed by sheaves or pulleys 520 (e.g., a conveyor system) into the verification system 200. The conveyor system is configured to transport filled pharmaceutical pouches into the verification system 200. The pharmaceutical pouches are transported such that, for example, the transparent material faces a first side (e.g., upward) of the verification system 200 and the opaque material faces a second side (e.g., downward) opposite the first side of the verification system 200. At least some of the sheaves may be driven by, for example, motors to move the strip of pouches.

As the pouches enter the verification system 200, the agitator 510 engages (e.g., agitates, vibrates, etc.) the pouches to help the pharmaceuticals within each pouch settle and separate or spread out. In some examples, the agitator 510 may include fingers, brushes, or the like that engage and agitate the pouches. Additionally, the fingers or brushes may be driven by, for example, a vibration motor to help agitate the pouches and move the pharmaceuticals around within each pouch. In other examples, the fingers or brushes may be passive elements that help comb the pharmaceuticals apart. In further examples, the agitator 510 may be omitted.

After the pouches are agitated, the pouches pass a sensor 460. In some examples, the sensor 460 may be, for example, a barcode scanner, a QR code reader, or an image sensor. In other examples, the sensor 460 may be a label camera that captures images. The sensor 460 is positioned on one side of the pouches (e.g., a label side of the pouches) and reads a code or captures an image of the label on each pouch. A light source 530 (e.g., a visible light) is also positioned on the same side of the pouches as the sensor 460 to selectively illuminate the pouches while the sensor 460 reads codes or captures images. The sensor 460 can communicate with the electronic processor 410 and memory 420 of the control system 400 to store the image or data related to the read/scanned code. The electronic processor 410 can also control operation of the light source 530 (e.g., when the light source 530 is turned on and off). The light source 530 is, for example, part of the lighting system 480, which is controlled by the electronic processor 410.

The pouches then pass the camera system 470. In the example illustrated, the camera system 470 includes a single camera with an infrared filter removed to capture both infrared images and the visible light images. The camera system 470 is positioned on an opposite side (e.g., the first side) of the pouches (e.g., on the side of the pouches facing the transparent material) from the sensor 460 so the labels on the pouches do not interfere with the camera system 470. The images of the pouches are captured from the first side of the verification system 200.

A heat source 490 is positioned on a side (e.g., a second side) of the pouches opposite the camera system 470 (e.g., the side of the pouches facing the opaque material and label). The heat source 490 includes, for example, a radiating heat source to provide radiating heat to the pharmaceutical pouches. In one example, the radiating heat source is an incandescent bulb, or other heat generating light source. In some examples, the radiating heat source may include an electric coil generating heat. The heat source 490 provides very low amounts of heat to the pharmaceutical pouch 300 to heat the pharmaceutical pouch 300. The pouches are heated from the second side of the verification system 200. As discussed above, the one side of the pharmaceutical pouch 300 includes an opaque material made of, for example, metallic foil. Metallic foils are very good conductors of heat and therefore heat up quickly. The metallic foils allow heat to pass through to the camera system 470. However, the pharmaceuticals within the pouch 300 are good insulators and therefore do not heat up as quickly as the metallic foil. The camera system 470 can then capture an image of the shadows cast by the pharmaceuticals within each pouch or the differing heat signals of the pouch and the pharmaceuticals within the pouch. In one example, the colder pharmaceuticals 310 form clear and distinct (for example, dark) shadows against the hotter (for example, brightly colored) background of the metallic foil. Similar to the sensor 460, the camera system 470 can communicate with the electronic processor 410 and memory 420 to store the image. The heat source 490 is controlled by the electronic processor 410, for example, to turn on and off and to adjust the intensity of heat.

In some examples, the heat source 490 is provided directly below the camera system 470, for example, as shown in FIG. 5A. In these examples, the heat source 490 heats the pharmaceutical pouch 300 around the same time and/or when the pharmaceutical pouch 300 is in the same position as when the camera system 470 is capturing an image of the pharmaceutical pouch 310. In other examples, the heat source 490 is positioned upstream of the camera system 470, for example, as shown in FIG. 5B. In these examples, the heat source 490 heats the pharmaceutical pouch 300 before the camera system 470 captures an image of the pharmaceutical pouch 300 and/or in a position prior to the position where the camera system 470 is capturing the image of the pharmaceutical pouch 300. In some examples, the heat source 490 may be provided on the same side as the camera system 470.

As the pouches are positioned under the camera system 470, a visible light source 540 also illuminates the pouches. The visible light source 540 (e.g., a visible spectrum light) is positioned on the same side of the pouches as the camera system 470 (e.g., on the side of the pouches facing the transparent material) to shine light on the pouch and illuminate the contents of the pouch. When the visible light source 540 illuminates the pouches, the camera system 470 captures a visible light image of each pouch, showing the color, shape, contour, surface finish, etc. of each pharmaceutical. In the illustrated example, the pouches are stopped under the camera system 470 to capture the IR image and the visible light image. The camera system 470 captures both images without moving so the images are lined-up for computer manipulation. The visible light source 540 is, for example, part of the lighting system 480, which is controlled by the electronic processor 410.

In the illustrated example, the camera system 470 captures a first image (e.g., an infrared image) and a second image (e.g., a visible spectrum image) in relatively rapid succession. For example, the heat source 490 can be turned on to briefly heat a pouch, and the camera system 470 can capture an image of the pouch in the infrared spectrum (that is, capture a heat signature of the pharmaceutical pouch 300). Then, the heat source 490 can be turned off, the visible light source 540 can be turned on to briefly illuminate the pouch with visible light, and the camera system 470 can capture an image of the pouch while the pouch is illuminated with the visible light (and before the pouch is disturbed/moved). In some examples, the order in which the images are captured may be reversed (e.g., the camera system 470 may first capture an image of the pouch while the pouch is illuminated with visible light, and then capture an image of the pouch in the infrared spectrum).

Although the camera system 470 is described as having a single camera with the infrared filter removed, in other examples, the camera system 470 may include two separate cameras. For example, one camera may be an infrared (IR) or near infrared (NIR) camera that operates in conjunction with the heat source 490 to capture images in the infrared spectrum, and the other camera may be a color camera or visible spectrum camera that operates in conjunction with the visible light source 540 to capture images in the visible spectrum.

In some examples, the verification system 200 may provide real-time monitoring of the pharmaceutical pouches as they pass through the system. For example, after the camera system 470 captures an infrared image of a pouch, the electronic processor 410 analyzes the image to determine the number and approximate size of each pharmaceutical within the pouch. Based on the label (which is associated with an expected prescription order), the electronic processor 410 determines whether the correct number of pharmaceuticals were loaded into the pouch. In addition, after the camera system 470 captures a visible light image of the pouch, the electronic processor 410 analyzes the image (in conjunction with the infrared image and the data from the label) to verify that each pouch is properly filled with the correct type of pharmaceuticals. Once the pouches are verified, the pouches are directed to the take-up roll, a bin, or other location for distribution.

When the verification system 200 determines that a pouch is improperly filled, the verification system 200 can provide immediate feedback to discard the pouch and/or fill a new pouch. For example, the verification system 200 can include a printer or other device to mark an improperly filled pouch with a large X, a colorful dot, a spray, or the like to identify that the pouch has an error. A pharmacist or other technician can then discard this pouch before the pouch is distributed. In addition, the verification system 200 can communicate with the packaging unit 120 to notify the packaging unit 120 to fill another pouch with the same prescription order, without having to wait for further input from the pharmacist or other technician. As such, disruptions to the packaging system are reduced.

Figure 6:
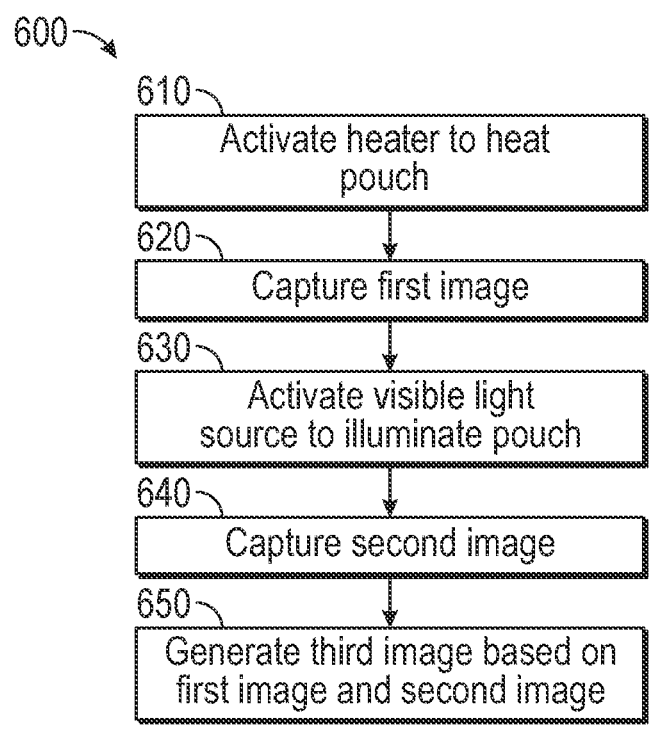
FIG. 6 is a flowchart of a method for verifying pharmaceuticals in pouches packaged by the automatic packager of FIG. 1 in accordance with some examples.

FIG. 6 is a flowchart illustrating one example method 600 for verifying pharmaceuticals in a pharmaceutical pouch dispensed by the automatic packager 100. The method 600 uses the verification system 200 described above with reference to FIGS. 5A and 5B. After the pouches are filled, the pouches are directed into the verification system 200. In some examples, the agitator 510 (FIGS. 5A and 5B) may engage or agitate the pouches to help spread apart the pharmaceuticals within the pouch. In other examples, this step may be omitted.

Figure 7:
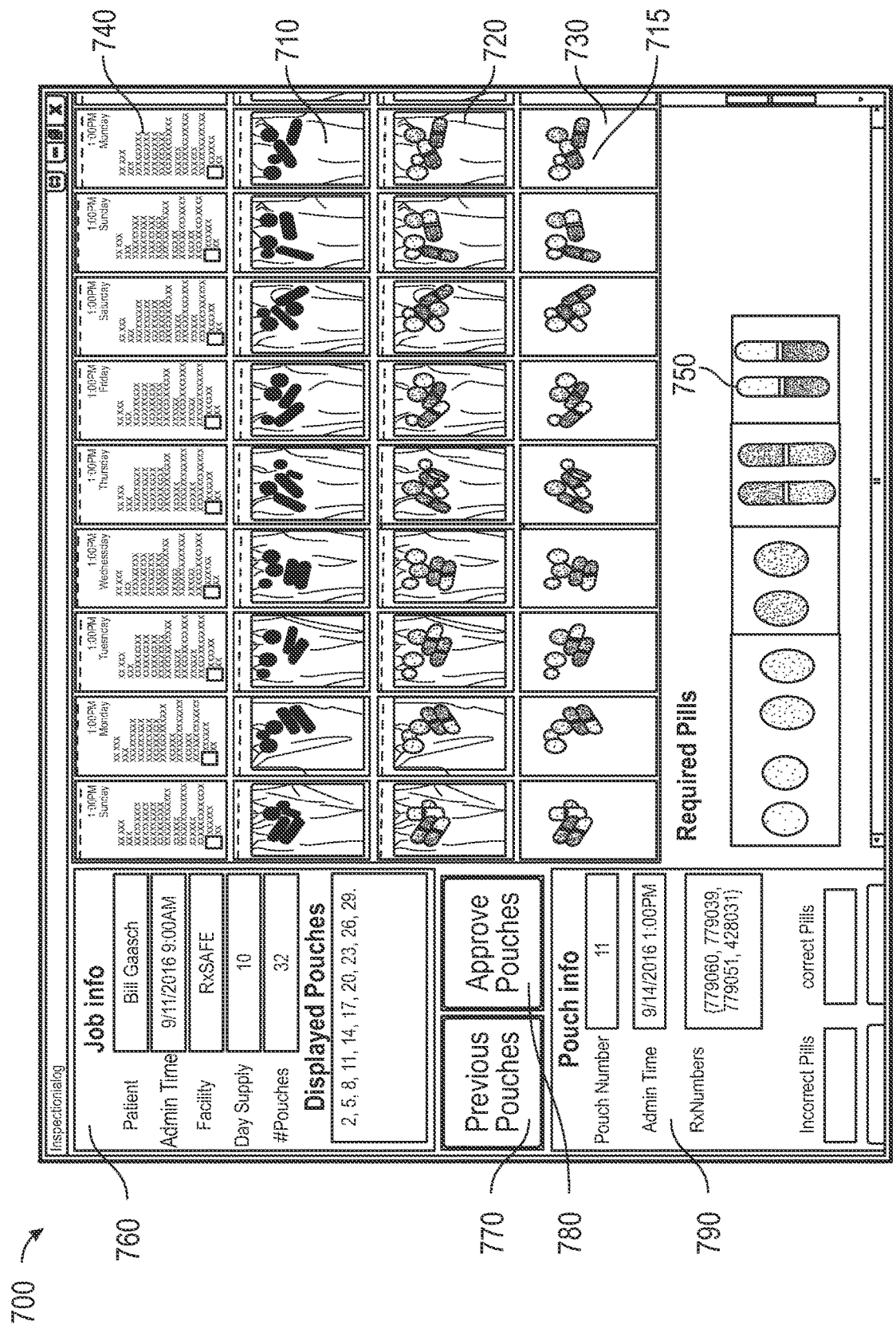
FIG. 7 illustrates a dashboard generated for verifying pharmaceuticals in pouches packaged by the automatic packager of FIG. 1 in accordance with some examples.

Once the pouches enter the verification system 200, the sensor 460 (e.g., label camera) can capture an image of the label on each pouch. The electronic processor 410 sends a signal or command to the sensor 460 to capture the image. The electronic processor 410 also directs the sensor 460 to store the captured image in the memory 420 or other suitable storage device. FIG. 7 shows an example of a label image 740 that is captured by the sensor 460. In other examples, the sensor 460 may read a barcode or other indicia on the label, rather than capturing an image of the label itself. In such examples, the electronic processor 410 may retrieve information regarding the pouch from a database and display the retrieved information in place of the label image 740.

As illustrated in FIG. 6, the method 600 includes activating the heat source 490 to heat the pharmaceutical pouch (at step 610). As discussed above, the heat source 490 may heat the pouch prior to the pouch reaching the camera system 470 or when the pouch is under the camera system 470. In the illustrated example, the electronic processor 410 sends a signal or command to the heat source 490 to turn the heat source 490 on. As explained above, the pharmaceutical pouch may include a metallic foil (or opaque material) that makes up one side of the pouch, and a transparent or colored translucent material (e.g., plastic, yellow or orange colored UV light blocking, etc.) that makes up the other side of the pouch. The pouch is positioned in the verification system 200 such that the opaque side is on the bottom side facing the heat source 490, while the transparent side is on the top side facing the camera system 470. When the heat source 490 heats the metallic foil, the colder pharmaceuticals within the pouch form shadows against the background of the hotter metallic foil of the pouch.

At step 620, the camera system 470 captures a first image (for example, a heat signature) of the pouch. The electronic processor 410 sends a signal or command to the camera system 470 to capture the image after the heat source 490 is turned on. The electronic processor 410 also directs the camera system 470 to store the captured image in the memory 420 or other suitable storage device. FIG. 7 shows an example infrared image 710 that is captured by the camera system 470. In some examples, the visible light source 540 is deactivated when capturing the first image such that the pouch is not illuminated by a visible spectrum light. This allows the camera system 470 to capture the first image in the IR or NIR spectrum.

At step 630, the electronic processor 410 activates the visible light source 540 to illuminate the pharmaceutical pouch when the pharmaceutical pouch is under the camera system 470. In particular, the electronic processor 410 sends a signal or command to the visible light source 540 to turn the visible light source 540 on. The visible light source 540 illuminates the pouch such that the pharmaceuticals within the pouch are visible to the camera system 470 through the transparent side of the pouch.

At step 640, the camera system 470 captures a second image of the pouch. In the illustrated example, the electronic processor 410 sends a signal or command to the camera system 470 to capture the image while the visible light source 540 is on. The electronic processor 410 also directs the camera system 470 to store the captured image in the memory 420 or other suitable storage device. FIG. 7 shows an example visible light image 720 that is captured by the camera system 470. After the image is captured, the electronic processor 410 sends a signal or command to the visible light source 540 to turn the visible light source 540 off. In some examples, the second image is captured after the first image is captured.

At step 650, the electronic processor 410 generates a third image based on the first (i.e., infrared) image and the second (i.e., visible light) image. Several techniques are contemplated by this invention to generate the third image. One example technique of generating the third image includes super imposing the first image on the second image and removing all other information from the second image that is not within the borders of the shadows created by the pharmaceuticals in the first image. Removing all other information may include, for example, filling regions in the third image that are not within the borders of the shadows created by the pharmaceuticals in the first image with a solid color (e.g., black). Another example technique includes filling in the colors from the second image corresponding to the shadow areas of the first image and filling the remained of the image with a solid color (e.g., black). Once the third image is created, the electronic processor 410 stores the image in the memory 420 or other suitable storage device. FIG. 7 shows an example third image 730 generated by the electronic processor 410.

In some examples, the pill images shown in the third image 730 can be rearranged by the electronic processor 410 on the solid background. For example, the electronic processor 410 can reorganize the pill images in a row or column to align the pill images in the same order from pouch to pouch. Such an arrangement enhances the ability of a pharmacist to observe and inspect the individual pills in each pouch. Additionally, the electronic processor 410 can order the individual pill images in the same order as images of expected pills 750 (FIGS. 7-8), which represent "gold images" of the pills from a database. Ordering the pill images in the same order as the expected pill images 750 also enhances a pharmacist's ability to compare the actual pills in each pouch to the expected pills in each pouch.

The above-described method 600 provides, among other things, verification that a pouch is filled with the proper type of pharmaceuticals because the pharmaceuticals are monitored from the time they are loaded into the cartridge 130 until they are dispensed to the customer. After the pharmaceuticals are loaded into a cartridge 130, the pharmaceuticals are maintained in a closed system that is generally not accessible to outside users. In addition, the method 600 verifies that the pouch is filled with the proper number of pharmaceuticals using relatively low-cost sensors (e.g., an image sensor on the packaging unit 120). Further, the method 600 creates an electronic chain of custody file that can be referenced later, if necessary. The method 600 may also create a database of filled pouch images should it be necessary to review an allegedly faulty pouch at a later time.

Dashboard

FIG. 7 illustrates a dashboard 700 that may be generated by the electronic processor 410 to aid a pharmacist in verifying that the pouches are correctly filled. The dashboard 700 is a compilation of images captured by the verification system 200 and generated by the electronic processor 410. The dashboard 700 may simultaneously display images from multiple pouches or may only display images from one pouch at a time. In some examples, the dashboard 700 may be displayed on a user interface (e.g., the input/output interface 440) of the automatic packager 100. In other examples, the dashboard 700 may be sent to a computing device (e.g., a smart telephone or a tablet computer) of a remote pharmacist.

In the example illustrated, the dashboard 700 includes an infrared first image 710, a visible light second image 720, a third image 730 based on the first and second images 710, 720, label information 740 (e.g., a label fourth image), and images of expected pills 750. The illustrated dashboard 700 also includes an interface for navigating the dashboard 700, including patient information 760, a "Previous Pouches" button 770, an "Approve Pouches" button 780, and pouch information 790. As shown, the first image 710, the second image 720, the third image 730, and the label information 740 may be arrayed in a grid on the dashboard 700, with each column of the grid corresponding to the images associated with one of the pouches. The first image 710 is the infrared image captured by the camera system 470. The second image 720 is the visible light image captured by the camera system 470. The third image 730 is generated by the electronic processor 410, as explained above. The label information 740 may be the label information printed on the pharmaceutical pouch captured by the sensor 460 or may be a computer-generated list of data associated with the barcode of the pouch. The images of expected pills 750 are stock images (e.g., "gold images" from a database) of the medication that a pharmacist should be expecting to see in the pouch based on the information input to pack the pouch.

The patient information 760 provides information about a patient to whom the pharmaceutical pouch is being dispensed. The patient information 760 may include, for example, patient name, administration time, facility, and the like. The "Previous Pouches" button 770 allows a user (for example, a pharmacist) to navigate to screens or columns of previous pouches stored in the system. The "Approve Pouches" button 780 allows the user to approve the current pouches displayed on the dashboard 700 and dispense the pouches to the patient. Once the displayed pouches are approved by actuating the button 780, the dashboard 700 can automatically navigate to the next screen or columns of pouches. The pouch information 790 displays information about the pouches being shown on the dashboard 700. The pouch information 790 may include, for example, a pouch number, an administration time, a prescription number, and the like.

In some examples, the electronic processor 410 may also automatically determine whether the pouches are correctly filled or incorrectly filled. This automatic verification can be used to assist a pharmacist in making his or her determination on whether the pouches were properly filled. In one example technique, the electronic processor 410 determines whether the number of pharmaceuticals or the type of pharmaceuticals (e.g., a first characteristic of pharmaceuticals) included in the pouch matches the number of pharmaceuticals or the type of pharmaceuticals (e.g., a second characteristic of expected pharmaceuticals) of expected pharmaceuticals, based on the label information 740 or information that is in the prescription order input. The electronic processor 410 may analyze the first image 710, the second image 720, the third image 730, or a combination of the three images to determine the number of pharmaceuticals included in the pouch. For example, the electronic processor 410 may determine the number of pharmaceuticals included in the pouch based on the distinct shadows created in the first image 710. In other examples, other known techniques may be used to determine the number of pharmaceuticals included in the pharmaceutical pouch based on analyzing an image of the pharmaceutical pouch.

The electronic processor 410 may also analyze the third image 730 of the pharmaceutical pouch to determine the type of pharmaceuticals included in the pharmaceutical pouch. The electronic processor 410 may employ known color analysis techniques on the third image 730 in addition to the known information from the expected pills 750 to determine whether the correct types of pharmaceuticals are included in the pharmaceutical pouch. Additionally or alternatively, the electronic processor 410 may use images captured by cameras on the motor base 310 to help identify the pharmaceuticals and to verify that the correct pharmaceuticals were dropped.

Based on these comparisons, the electronic processor 410 provides indications on the dashboard 700 to identify whether the electronic processor 410 detects the pouches were correctly or incorrectly filled. For example, the dashboard 700 may display a first indication on one or more of the images 710, 720, 730, 740, identifying that the electronic processor 410 detects the pouch was properly filled. In some examples, the dashboard 700 may display a border 1015 having a first color (e.g., green) around the images 710, 720, 730, 740 to indicate the pharmaceutical pouch is correctly filled. Similarly, the dashboard 700 may display a second indication on one or more of the images 710, 720, 730, 740, identifying that the electronic processor 410 detects the pouch was not properly filled. In some examples, the dashboard 700 displays a border 715 having a second color (e.g., red) around the images 710, 720, 730, 740 to indicate the pharmaceutical pouch might be incorrectly filled. Other indicia (e.g., check marks, X's, etc.) may also be used to show that a pharmaceutical pouch is correctly or incorrectly filled.

Figure 8:
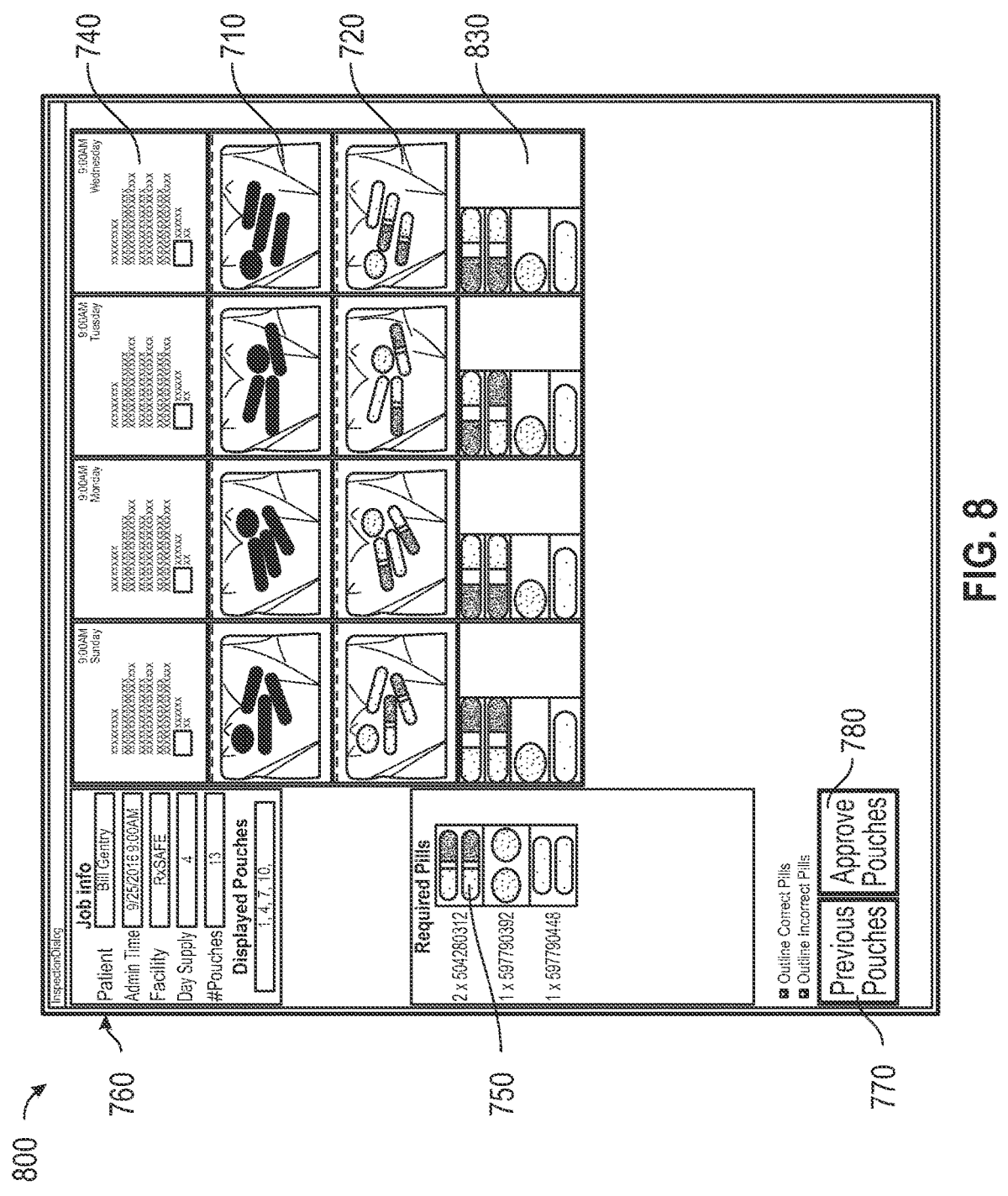
Figure 9:
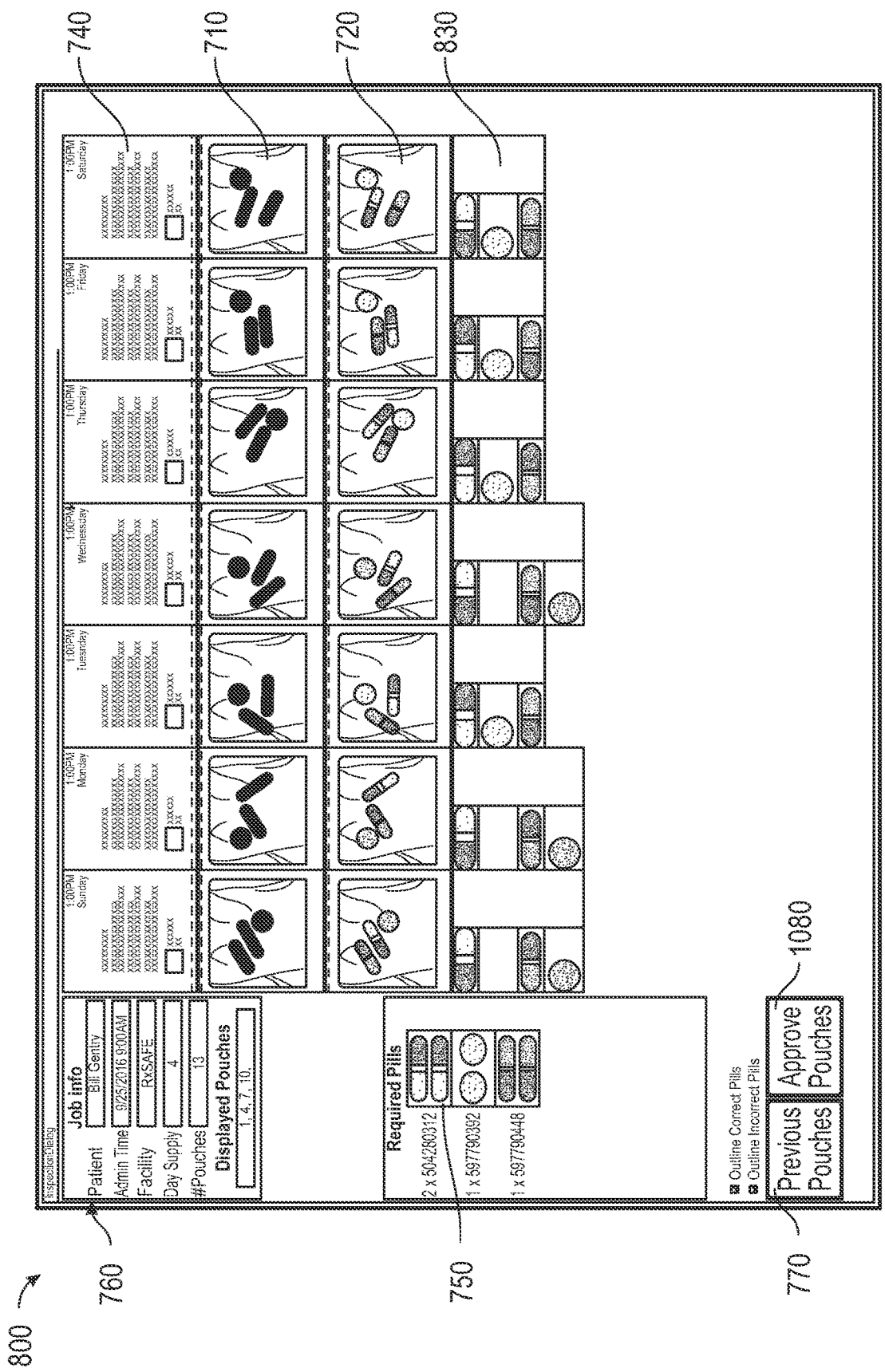
FIG. 9 illustrates a dashboard generated for verifying pharmaceuticals in pouches packaged by the automatic packager of FIG. 1 in accordance with some examples.

FIGS. 8 and 9 illustrate another dashboard 800 that may be generated by the electronic processor 410 to aid a pharmacist in verifying that the pouches are correctly filled. The dashboard 800 is displayed similar to the dashboard 700 and includes similar components as dashboard 700. The dashboard 800 includes a fourth image 830 that is generated based on the first image 710 and the second image 720, similar to the third image 730. However, in the fourth image 830, the pharmaceuticals identified in the pouch are arranged in, for example, rows or columns. In addition, the images of the expected pills 750 are displayed on a side of the dashboard 800 such that they are along the same eye level as the fourth image 830.

In some examples, the fourth image 830 may be generated based on the third image 730. As described above, the first image 710 is used to define borders or boundaries of the pharmaceuticals within the pouch. Once the third image 730 is generated, individual pharmaceuticals may similarly be identified based on the borders or boundary information from first image 710. The individual pharmaceuticals may then be arranged in rows or columns to generate the fourth image 830. The fourth image 830 may be displayed such that the individual pharmaceuticals in the fourth image 830 align with individual pharmaceuticals in the images of expected pills 750, as shown.

In addition, the electronic processor 410 may determine whether the individual pharmaceuticals in the fourth image 830 correspond to the individual pharmaceuticals in the images of expected pharmaceuticals 750. When the electronic processor 410 determines that an individual pharmaceutical in the fourth image 830 corresponds with the images of expected pharmaceuticals, the dashboard 800 may display an indication, for example, a green border around the individual pill to indicate that the pouch includes the expected pharmaceutical (shown in FIG. 9). When the electronic processor 410 determines that an individual pharmaceutical in the fourth image 830 does not correspond with the images of expected pharmaceutical (i.e., a wrong kind of pharmaceutical is included in the pouch), the dashboard 800 may display an indication, for example a red border around the individual pill to indicate that the pouch includes a pharmaceutical that should not be included in the pouch (shown in FIG. 9). In addition, the dashboard 800 may also display an indication, for example, a red border around an empty space aligned with an image of an expected pill 750 when the expected pill is not found in the fourth image 830 (e.g., when the pill is missing from the pouch) (shown in FIG. 9). In some examples, the system may not allow the "Approve Pouches" button 780 to be actuated until each red-bordered image is individually examined and accepted, rejected, quarantined, or otherwise explained by the pharmacist.

Figure 10:
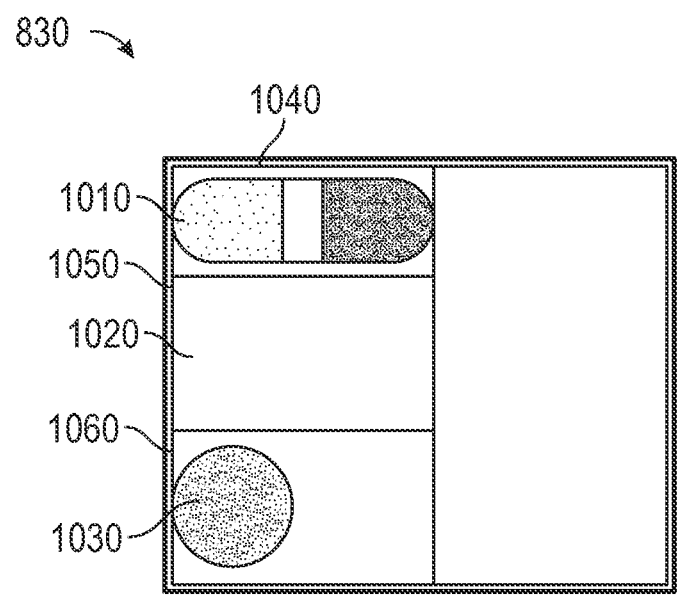
FIG. 10 illustrates an image from the dashboard shown in FIG. 9 in accordance with some examples.

FIG. 10 illustrates an example fourth image 830 in further detail. In the example illustrated, the fourth image 830 displays a first pharmaceutical 1010, a blank space 1020 (which indicates where a correct pill should have been displayed), and a second pharmaceutical 1030. The fourth image 830 also displays indications 1040, 1050, and 1060 in the form of red and green borders around the first pharmaceutical 1010, the blank space 1020, and the second pharmaceutical 1030 respectively. The first pharmaceutical 1010 corresponds to an image of an expected pill 750 and is shown with the green border 1040. The first pharmaceutical may be displayed along the same level (e.g., horizontally across or vertically above) of the corresponding image of expected pill 750 (as shown in FIGS. 8 and 9). As such, the pharmacist verifying the pouches may easily conclude that the current pouch includes a correctly filled pharmaceutical. The blank space 1020 is shown with the red border 1050. As described above, a blank space is displayed in the fourth image 830 to indicate that an expected pill is not found in the pouch being verified. The blank space 1020 may be displayed along the same level (e.g., horizontally across or vertically above) of a corresponding image of an expected pill 750 that is missing from the pouch (as shown in FIGS. 8 and 9). As such, the pharmacist verifying the pouches may easily conclude that the current pouch is missing a pharmaceutical. The illustrated second pharmaceutical 1030 is also shown with the red border 1060. The second pharmaceutical 1030 may be a pharmaceutical that was incorrectly included in the pouch. The second pharmaceutical 1030 may be displayed at the end of image (e.g., after or below the correctly filled pharmaceuticals and any blank spaces). As such, the pharmacist verifying the pouches may easily conclude that the current pouch includes an improper pharmaceutical.

In some examples, the pharmacist may select or click the "Approve Pouches" button 780 after reviewing all the pouches and each individual suspected pouch to verify that the pouch corresponding to the first column of images is correctly filled. When the pharmacist selects or clicks the "Approve Pouches" button 780, the dashboard moves the grid of images to the left by one set of images to display the contents of the next pouch. Scrolling through the pouch images in this manner allows each set of images to be aligned next to the "gold images" of the expected pills 750. As such, the pharmacist may quickly and efficiently verify the contents of the pouch when the fourth image 830 is next to the images of expected pills 750.

Various features and advantages of the disclosure are set forth in the following claims.

What is claimed is:

1. An automatic packager for pharmaceuticals comprising:
    a feed roll for forming a pharmaceutical pouch;
    a dispenser configured to dispense pharmaceuticals into the pharmaceutical pouch formed by the feed roll; and
    a verification system including
        a camera system configured to capture images in a visible spectrum and an infrared spectrum,
        a heat source configured to heat the pharmaceutical pouch,
        a visible light source configured to output visible spectrum light, and
        an electronic processor communicatively coupled to the camera system, the heat source, and the visible light source, the electronic processor configured to
            activate the heat source to heat the pharmaceutical pouch,
            capture a first image, using the camera system, of the pharmaceutical pouch when the pharmaceutical pouch is heated by the heat source,
            activate the visible light source to illuminate the pharmaceutical pouch,
            capture a second image, using the camera system, of the pharmaceutical pouch while illuminated by the visible light source, and
            generate a dashboard to simultaneously display first images and second images from a plurality of pharmaceutical pouches, wherein the first image and the second image are arrayed in a grid on the dashboard.

2. The automatic packager of claim 1, wherein the verification system is provided downstream of the dispenser.

3. The automatic packager of claim 1, wherein the pharmaceutical pouch formed by the feed roll includes an opaque metallic foil on one or both sides of the pharmaceutical pouch.

4. The automatic packager of claim 1, wherein the pharmaceutical pouch formed by the feed roll includes an opaque material on one side and a translucent material on the other side, wherein the electronic processor is further configured to
    generate a third image based on the first image and the second image, wherein the dashboard simultaneously display first images, second images, and third images, and wherein the first image, the second image, and the third image are arrayed in a grid on the dashboard.

5. The automatic packager of claim 4, further comprising a conveyor system configured to transport filled pharmaceutical pouches into the verification system, wherein the pharmaceutical pouches are transported such that the translucent material faces a first side of the verification system and the opaque material faces a second side opposite the first side of the verification system.

6. The automatic packager of claim 5, wherein the camera system includes an image capture device positioned on the first side of the verification system, wherein the heat source is positioned on the second side of the verification system.

7. The automatic packager of claim 6, wherein the heat source is positioned upstream from the image capture device.

8. The automatic packager of claim 6, wherein the visible light source is deactivated when the first image is captured such that the pharmaceutical pouch being captured is not illuminated by a visible spectrum light.

9. The automatic packager of claim 6, wherein the second image is captured after the first image is captured.

10. The automatic packager of claim 6, further comprising:
    a printer configured to print label information on the pharmaceutical pouch; and
    a label camera positioned in the verification system, wherein the electronic processor is configured to capture a fourth image, using the label camera, of the label information printed on the pharmaceutical pouch,
    wherein the dashboard further displays the label images from the plurality of pharmaceutical pouches.

11. A method for verifying pharmaceuticals packaged by an automatic packager, the automatic packager including a feed roll for forming a pharmaceutical pouch, a dispenser configured to dispense pharmaceuticals into the pharmaceutical pouch formed by the feed roll, a camera system configured to capture images in a visible spectrum and an infrared spectrum, a heat source configured to heat the pharmaceutical pouch, a visible light source configured to output visible spectrum light, and an electronic processor communicatively coupled to the camera system, the heat source, and the visible light source, the method comprising:
    activating, by the electronic processor, the heat source to heat the pharmaceutical pouch;
    capturing a first image, by the electronic processor using the camera system, of the pharmaceutical pouch when the pharmaceutical pouch is heated by the heat source;
    activating, by the electronic processor, the visible light source to illuminate the pharmaceutical pouch;

capturing a second image, by the electronic processor using the camera system, of the pharmaceutical pouch while illuminated by the visible light source; and generating, by the electronic processor, a dashboard to simultaneously display first images and second images from a plurality of pharmaceutical pouches, wherein the first image and the second image are arrayed in a grid on the dashboard.

12. The method of claim 11, further comprising performing verification using the camera system subsequent to packaging pharmaceuticals in the pharmaceutical pouch.

13. The method of claim 11, wherein the pharmaceutical pouch formed by the feed roll includes an opaque metallic foil on one or both side of the pharmaceutical pouch.

14. The method of claim 11, wherein the pharmaceutical pouch formed by the feed roll includes an opaque material on one side and a translucent material on the other side, further comprising:

generating, by the electronic processor, a third image based on the first image and the second image wherein the dashboard simultaneously display first images, second images, and third images, and wherein the first image, the second image, and the third image are arrayed in a grid on the dashboard.

15. The method of claim 14, further comprising transporting, using a conveyor system, filled pharmaceutical pouches into a verification system including the camera system, the heat source and the visible light source, wherein the pharmaceutical pouches are transported such that the translucent material faces a first side of the verification system and the opaque material faces a second side opposite the first side of the verification system.

16. The method of claim 15, further comprising:
capturing images of the pharmaceutical pouches from the first side of the verification system; and
heating the pharmaceutical pouches from a second side of the verification system.

17. The method of claim 16, further comprising heating the pharmaceutical pouch prior to capturing the first image of the pharmaceutical pouch.

18. The method of claim 16, further comprising deactivating the visible light source when the first image is captured such that the pharmaceutical pouch being captured is not illuminated by a visible spectrum light.

19. The method of claim 16, further comprising capturing the second image after capturing the first image.

20. The method of claim 16, further comprising:
printing, using a printer, label information on the pharmaceutical pouch; and
capturing, by the electronic processor using a label camera positioned in the verification system, a fourth image of the label information printed on the pharmaceutical pouch,
wherein the dashboard further displays the label images from the plurality of pharmaceutical pouches.

* * * * *